A. A. HORTON.
ADDING MACHINE.
APPLICATION FILED APR. 18, 1911.

1,016,501.

Patented Feb. 6, 1912.
7 SHEETS—SHEET 4.

Witnesses
E. R. Barrett
Robert Dobberman

Allen A. Horton
Inventor
by Rector Hibben Davis Macauley
his Attys

A. A. HORTON.
ADDING MACHINE.
APPLICATION FILED APR. 18, 1911.

1,016,501.

Patented Feb. 6, 1912.

A. A. HORTON.
ADDING MACHINE.
APPLICATION FILED APR. 18, 1911.

1,016,501.

Patented Feb. 6, 1912.
7 SHEETS—SHEET 7.

Fig. 16.

UNITED STATES PATENT OFFICE.

ALLEN A. HORTON, OF DETROIT, MICHIGAN, ASSIGNOR TO BURROUGHS ADDING MACHINE COMPANY, OF DETROIT, MICHIGAN, A CORPORATION OF MICHIGAN.

ADDING-MACHINE.

1,016,501.   Specification of Letters Patent.   Patented Feb. 6, 1912.

Application filed April 18, 1911. Serial No. 621,872.

*To all whom it may concern:*

Be it known that I, ALLEN A. HORTON, a citizen of the United States, residing at Detroit, county of Wayne, and State of Michigan, have invented certain new and useful Improvements in Adding-Machines, of which the following is a specification.

The present invention relates to that type of adding machine or calculator which is key-operated as distinguished from the type in which amount keys merely serve to set stops and the operation of adding is accomplished by a prime mover such as a crank handle or lever.

One object of the invention is to provide improved means for preventing overthrow of adding wheels, which might otherwise result from undue vibration or springing of levers acted upon by the keys.

Another object of the invention is to provide an improved form of transfer mechanism which will prohibit loss of transfers, or overthrow in rapid successive depression of the higher denomination keys.

Another object of the invention is to provide clearing means, *i. e.* means for turning wheels to zero, possessed of increased efficiency in performing this function and in leaving the machine fully restored to condition for new use.

With these and incidental objects in view, the invention consists in certain novel features of construction and combinations of parts the essential elements whereof are recited in the appended claims and a preferred form of embodiment of which is described in detail hereinafter and fully illustrated in the accompanying drawings forming a part of this specification.

Of said drawings.

Figures 1, 2:
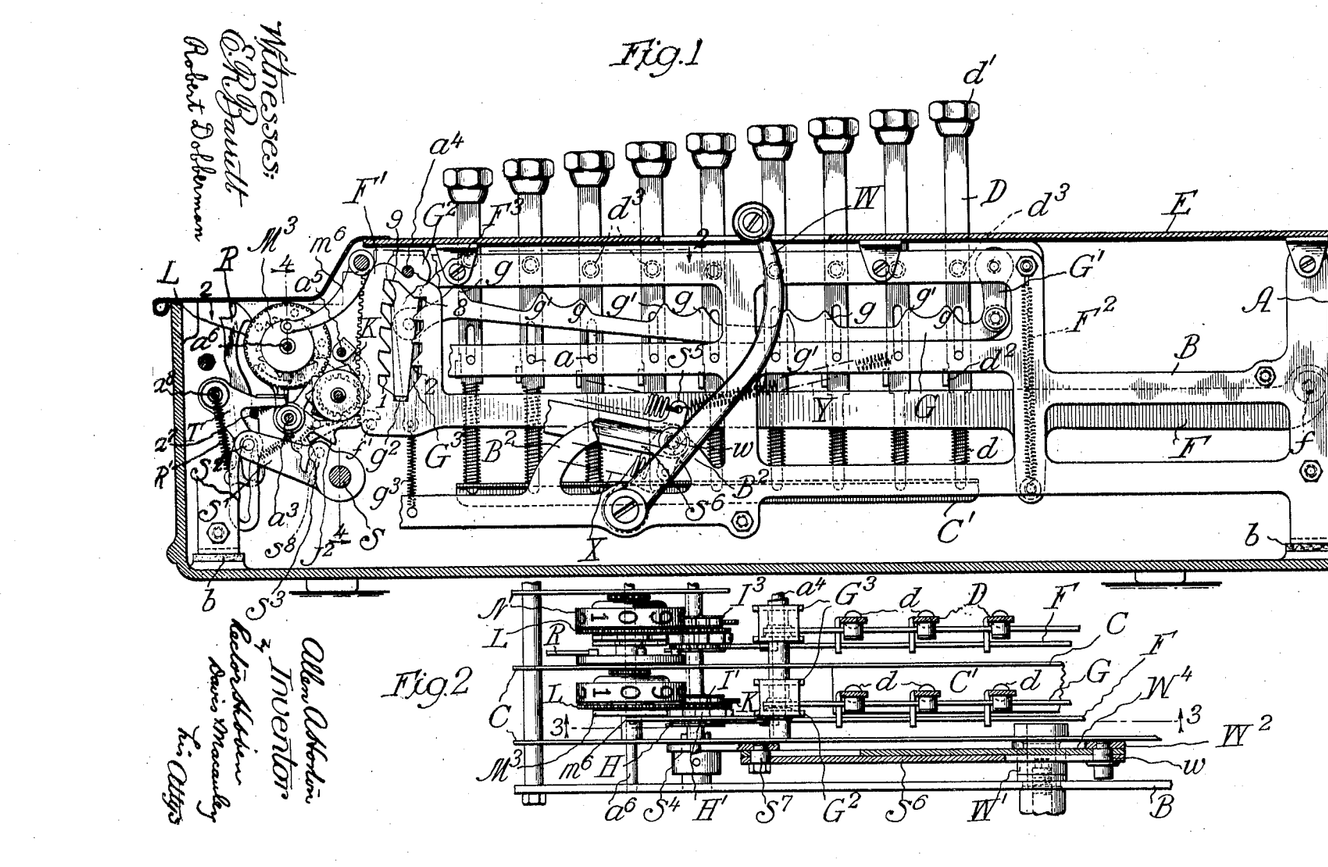
Figure 1 represents partly in right side elevation and partly in section a machine embodying the invention, all the parts being at normal.
Fig. 2 is a fragmentary horizontal section on the line 2—2 of Fig. 1.

The machine is inclosed in a suitable casing A preferably a casting comprising base and sides; and the mechanism is supported by a suitable framework comprising side pieces B with feet resting upon and secured to bosses on the bottom of said casting, sound deadening pads $b$ being preferably interposed. The framework also comprises intermediate uprights C to certain of which are secured angle plates C'. Key stems D slide through a top plate E and through said angle plates and are upheld by spiral springs $d$ all as shown in Figs. 1 and 2. Also they are slotted to embrace guiding cross rods $a$ held by the frame side pieces and uprights. The keys are arranged in parallel rows, nine in a row, as usual, (Fig. 16) and their surmounting finger pieces $d'$ inscribed from "1" at the front to "9" at the back and if desired with complementary numerals for subtraction purposes. There is a long lever F for each row of keys, these levers being pivoted at the extreme rear of the machine on a frame cross rod $f$ and extending along the keys to a point forward of them where each lever has integral with it a segmental rack F'. Main springs $F^2$ connect depending arms of the levers with overhead portions of the framework and the levers are adapted to be forced down against the stress of these springs in varying degree by depression of the keys, and upon release of the keys the springs $F^2$ exert their power to drive gearing hereinafter described which is in mesh with the segments F'. Lugs $d^2$ struck out from the key-stems extend over the levers F to contact with the same at various distances from their pivots to differentially operate the levers.

As there is a possibility that in rapid and hard operation, especially with the higher denomination keys in action, extreme vibration of parts might cause movement of the acting end of the lever beyond that measured by the key, special means are employed to guard against overthrow of the adding wheels by any such excessive motion of the levers. It is obvious that this can be accomplished by positively stopping the forward ends of the levers directly below the segmental racks, and by the present invention means are provided for doing this in a very simple and effective way. As the devices employed in this connection for each row of keys are the same, a description of one complete set will suffice.

Referring first to Fig. 1, a bar G is arranged below the key stems suspended by a pair of radius links G' and $G^2$ journaled on cross rods at the top of the machine frame, and this bar is formed along its upper edge with series of cam projections $g$ and $g'$, there being one such projection for each key, and the stems of the keys being equipped with roller studs $d^3$ to act upon them. Outer inclined edges of a pair of these projections $g$ and $g'$ extend on opposite angles for coöperation with the studs respectively on adjacent keys so that an odd number key thrusts the bar G one way (forward), and an even number key thrusts the bar the opposite way (rearward). The forward radius link $G^2$ extends downward beyond the bar G and is bent laterally to form a foot $g^2$ to coöperate with stop shoulders on the lever F. The latter is formed at the forward end, immediately back of the gear segment F', with a widened open-center portion $F^3$ within which the foot $g^2$ projects. The inner confronting edges of this portion of the lever have ratchet formations providing two series of downwardly directed shoulders, the shoulders at one side being staggered with reference to the shoulders at the other side and there being a terminal shoulder at the upper end at each side and in similar relation. The foot $g^2$ normally seats in a square notch $g^4$ centrally located between inclined edges below the lowermost shoulders of the two series, and said foot has beveled edges to facilitate its so seating. The extended radius link $G^2$ is preferably formed as one side of a yoke, the other side piece $G^3$ of which is connected by a spring $g^3$ to the machine frame, said spring serving to centralize the foot $g^2$.

Normally the condition is as illustrated in Fig. 1, the foot $g^2$ being out of line with all of the stop shoulders, and this condition continues during the first part of the descent of a key, or until the roller stud $d^3$ of a key strikes one of the cam projections $g$ or $g'$. It will be noted that there are, all told, nine of the stop shoulders, one for each key, and of course the purpose is to throw the foot $g^2$ into the path of one or another of these stop shoulders according to which key is depressed. Naturally the lowermost shoulder designated by the numeral "1" is to come into play when the foremost or 1 key is depressed, the next higher shoulder, which is designated by the numeral 2, is to come into play when the next or "2" key is depressed, and so on.

Figure 3:
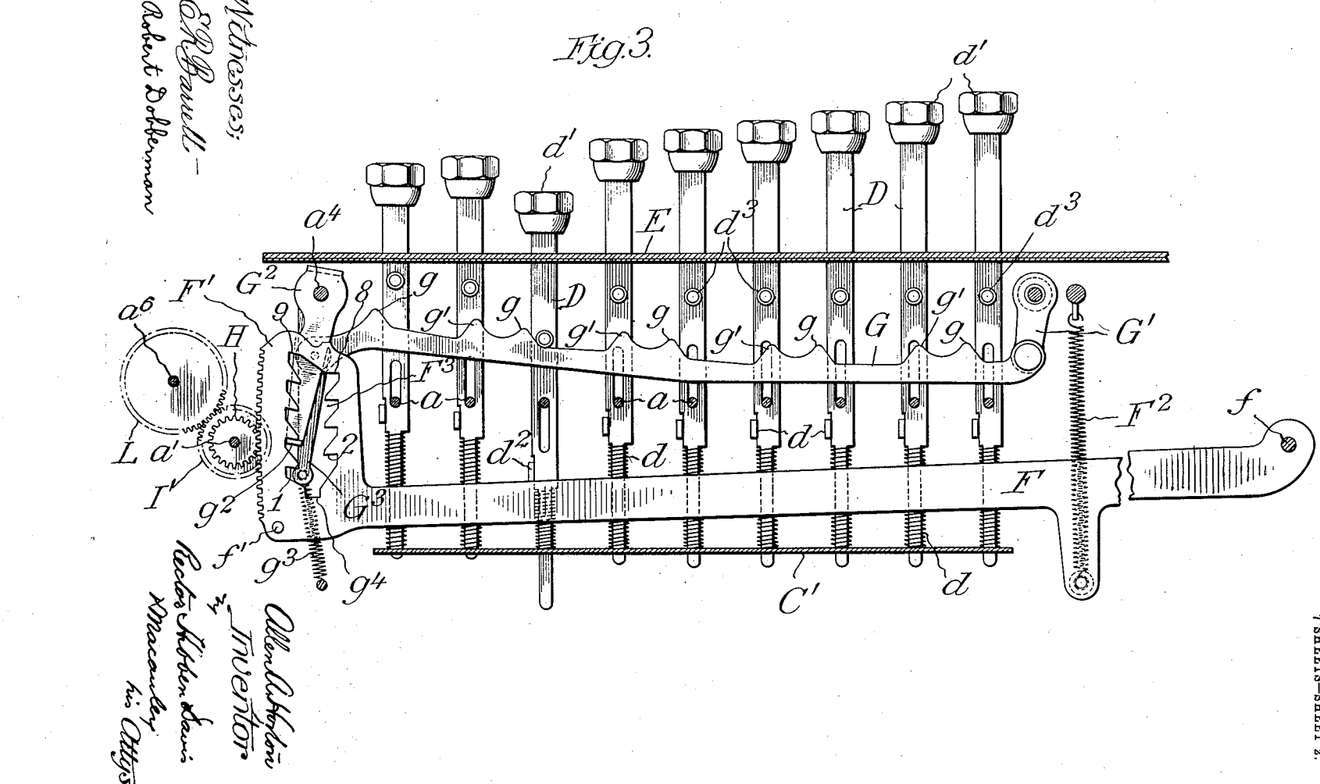
Fig. 3 shows the front part of the machine viewed from the right substantially on the section line 3—3 of Fig. 2 and with a key depressed.

It will be remembered that the odd keys coöperate with corresponding inclines of the cam projections $g$, whereas the even keys coöperate with inclines of the cam projections $g'$ which extend oppositely to said inclines of the projections $g$. In this connection it is to be noted that the series of four shoulders at the rear side of the opening in the sector lever serve for the even keys, whereas the series of five shoulders at the front side of said opening serve for the odd keys. The five shoulders of the forward series begin with that designated 1 and end with the terminal shoulder designated 9. Correspondingly, the four shoulders of the rear series begin with that designated 2 and end with the terminal shoulder designated 8. The bar G is not straight but inclines upward from about its middle toward the front. Furthermore, the key studs $d^3$ are not all in horizontal alinement and the cam projections vary to some extent in outline, the purpose being to properly time the action of the foot $g^2$ in its swinging forward or back to engage with one or another of the stop shoulders. Thus, the "1" key strikes its cam projection at an earlier point in its descent than the "2" key strikes its cam projection, since the foot $g^2$ should swing under the shoulder 1 one step earlier in descent of the sector F' than such foot should swing the other way for engagement with the shoulder 2. The desideratum is to swing the foot as soon as possible into line with the shoulder, so as to insure full engagement between the parts for effectively stopping the sector. Varying movements of the lever F caused by depression of different keys through contact at varying distances from the pivot of the lever, and the fact that the lugs $d^2$ are not normally the same distance from the lever, but vary somewhat in order to provide for the proper division of movement of the sector F' into nine equal increments of movement, are matters that require to be taken into consideration in establishing the relation between the several keys and the swinging bar G, so that the sector will descend the proper distance before the foot $g^2$ swings under one of the stop shoulders, while at the same time providing for such movement of the foot at the earliest practicable moment. The point is of course to make sure that the foot engages the shoulder corresponding with the key. It will be noted that this is very greatly promoted by having the nine stop shoulders in different series, those belonging to the odd keys making up one series and those belonging to the even keys making up another oppositely located series. This clearly provides for a much greater space between the adjacent shoulders of the same series than if all of the shoulders were in a single series, and therefore gives greater latitude for the early and full entry of the foot into the path of the stop shoulder. For example, in the case of depression of the "3" key as illustrated in Fig. 3, the foot can and does begin its forward swing as soon as the shoulder 1 has passed down well beyond it and without regard to the passage of the shoulder 2 because of course the foot is to swing away from the latter.

It has been before mentioned that the formation along the front and rear sides of the opening in the wide portion $F^3$ of the sector lever is in the nature of a ratchet. Thus, the projections which supply the stop shoulders have beveled upper edges. This serves the double purpose of providing for the early swing of the foot under any shoulder and also causing the foot to be forced out of line with the shoulder upon ascension of the sector. Of course the spring $g^8$ constantly tends to bring the foot to a central position out of line with all of the shoulders, but in rapid operation this might not alone be dependable. Without the spring the parts would restore to normal but there would be objectionable vibration of the foot and connected parts in rapid rise of the sector, and excessive noise-making contact between the foot and different inclined edges of the stop projections. As it is, the spring acts to centralize the foot and steady it so that its vibration is reduced to the minimum. Of course in so acting the spring restores the bar G to normal position, and engagement of the square notch $g^4$ with the foot at the conclusion of the rise of the sector, locks said bar in its proper position for being acted upon in exact time by the keys.

Figure 13:
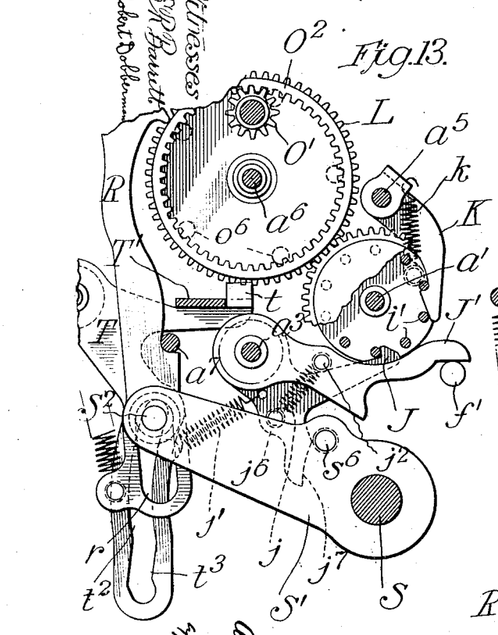
Fig. 13 is a section substantially on line 13—13 of Fig. 4.

Passing now to the registering mechanism, a journal rod $a'$ extends across the front part of the machine, being supported at its opposite end in the side frame pieces B and intermediately by the uprights C through which it extends; and upon this rod are mounted pinions H one for each of the sectors F' and meshing therewith respectively, these pinions being rotatable independently of each other and adapted to be turned back and forth by the sectors, with which they are constantly engaged. The sectors are kept in alinement with the pinions by disks $h$ and $h'$ secured to opposite sides of the pinions and overlapping the sectors, and the disks $h'$ have peripheral flanges formed as ratchet wheels H' of the internal variety, see Fig. 5. There is loosely mounted upon the journal rod $a'$ adjacent each of the pinions H a sleeve I which is enlarged into a hub-like portion within the internal ratchet, and upon said sleeve against a shoulder thereof is secured a gear wheel I' carrying a pawl $I^2$ pivotally mounted upon one side thereof within the said ratchet and pressed into engagement therewith by a spring $i$ seating in a socket of the hub-like portion of the sleeve as shown in Fig. 5. Obviously this arrangement provides for turning of the pinion H by downward movement of the sector without turning the gear-wheel I', whereas when the sector returns, said gear-wheel will be turned with the pinion and ratchet. To prevent overthrow in the latter operation, there is mounted upon the sleeve I, a lantern wheel $I^3$, the same being here shown as equipped with studs or pins $i'$, engaging holes in the gear-wheel I', Fig. 4, whereby to rotatively connect the lantern wheel, gear and sleeve. Stop pawls are loosely mounted upon another journal rod $a^3$, there being one such pawl for each lantern wheel $I^3$. Pawls designated J, comprising all except the one associated with the units section or bank of the machine, are connected by springs $j$ with arms J' also loose on cross rod $a^3$, and which extend alongside the associated sectors F' respectively over studs $f'$ projecting laterally from the lower portions of the sectors, as shown in Fig. 1, see also Figs. 13 and 14; so that normally such pawls are forced upwardly into engagement with pins of the lantern wheels as shown in Fig. 13. Springs $j'$ tend to withdraw these pawls from engagement with said wheels so that upon the lowering of any sector the associated pawl unlocks the gear-wheel I', the gravity of the pawl and arm J' also serving to bring this about, though preferably not relied upon. It will thus be seen that the gear wheels I' are normally locked by these pawls against turning in the direction in which the sectors turn them through the ratchet and pawl mechanism above described, and it will also be seen that the driving of these pawls into engagement with the lantern wheels by the sectors in arriving at their normal position will effectually prevent any over-rotation of the gears. Upward movement of the sectors is here shown as limited by their abutment against the journal rod $a^4$ on which the stop members $G^2$ and $G^3$ are mounted, and of course by the time the sectors strike this rod they will have driven the pawls into effective position.

Figure 11:
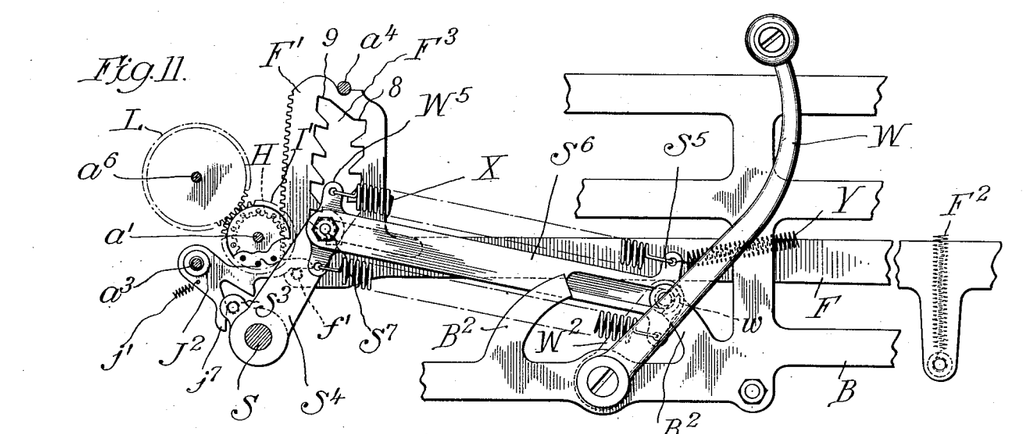
Fig. 11 is a right side elevation showing parts omitted from Fig. 1.
Figure 12:
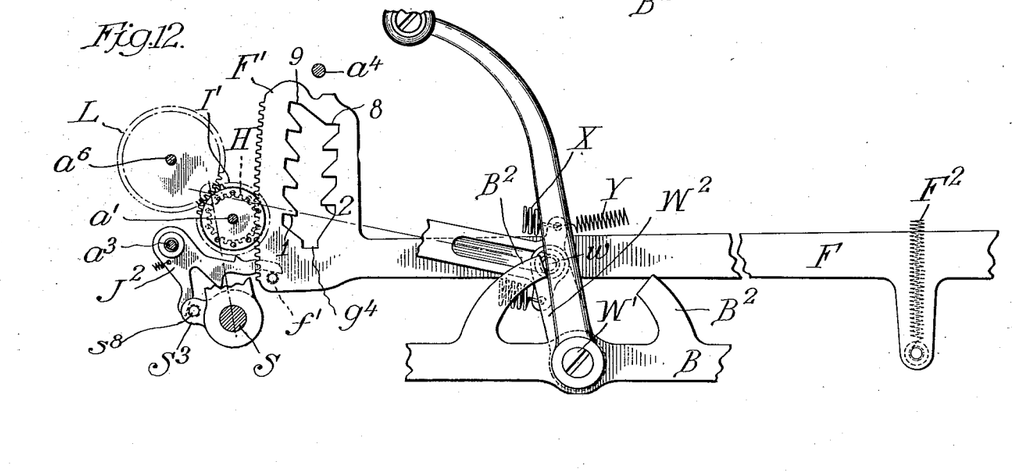
Fig. 12 is a similar view illustrating a different condition.

It will be understood, of course, that the springs $j$ are superior to the springs $j'$, so that when the studs $f'$ drive against the arms J' the pawls J will move as though integral with the arms (the spring-studs $j^2$ on the arms J' overlying the upper edges of the pawls J) except, of course, that the pawls would yield if their ends happened to encounter the passing pins of the lantern wheels. This, however, is not the real occasion for the yielding connection between the pawls and the arms, which has to do primarily with the resetting or turning to zero of the number wheels, presently to be described, which are actuated by the gears I'. In the case of the units set of devices, the stop pawl is not separate from its actuating arm, but a one-piece structure $J^2$ is employed as shown in Figs. 1, 11 and 12, such one-piece structure having a tooth or projection to engage the lantern wheel and a rearward extension to engage the sector stud $f'$. Insofar as concerns the locking of the gear-wheel, this pawl $J^2$ functions the same as the other pawls J, though as will be hereinafter described it has a special function to perform in connection with the resetting or turninig to zero. Backward turning of the gear wheels I' is prevented by the engagement with the lantern wheels of pawls K independently journaled upon another cross-rod $a^5$, and pressed by springs $k$ against the pins of the lantern wheels, see Fig. 13. The gear wheels I' are in constant engagement with the members respectively of another set of gear wheels L which are secured respectively to hubs $m$ (Fig. 4) journaled upon sleeves $n$ which are in turn journaled upon a cross-rod $a^6$ extending from side to side of the machine. There are also secured to said hubs $m$, arms $m'$ carrying studs $m^2$ on which are journaled pinions M'. These pinions protrude through orifices in the gears L and as planet gears they engage the sun gears $M^2$ upon the rod $a^6$. All the sun gears except that with which the planet gear M' of the units order engages, are rotatable upon the rod $a^6$ for transfer or tens carrying purposes, it being of course obvious that there is no carrying to the units wheel. The planet gears M' are of double width, and besides meshing with the sun gears $M^2$, mesh with internal gears N which form part of the number wheels N', whose webs $N^2$ are fastened to the aforesaid sleeves $n$ respectively. There are formed upon the latter outside these webs, pinions $N^3$ which mesh with gear wheels O on journals in bearings set in the division plates C, such journals carrying on the other sides of said plates, pinions O' in mesh with the internal gears $O^2$. These internal gears have their webs secured to hubs $O^3$ journaled upon sleeves $m^4$ integral with the hubs of the sun gears $M^2$. Springs P are coiled around the hubs $O^3$, there being one spring for each hub, and each spring being connected at one end to a stud $o$ projecting from the side of a disk $O^4$ also secured to the hub $O^3$. The said disk is formed with a slot $o'$ in the arc of a circle, see Figs. 7 and 9, and through such slot projects a stud $p$ from the side of another disk P' which is secured to the hub of the sun gear $M^2$, it being understood that there is one of these disks secured to each sun wheel except that belonging to the units section of the machine, which always remains fixed. It is here shown so held by a frame arm $m^6$ which interlocks with a stud on a disk $M^3$ secured to the hub of this same wheel (Fig. 1).

It will be obvious that the turning of any gear wheel L by a sector-actuated gear-wheel I' will result in turning of the associated number wheel N' through the medium of the planet gear M' as the latter traverses the sun gear $M^2$, being at the same time engaged with the internal gear N. Naturally the ratio of movement is made such as to turn the number wheel distances according with the number of the key depressed. In so far as the units wheel is concerned this is the only turning thereof which need be considered, except that done in a zero-setting operation, but of course as to higher order wheels they must receive one step movements to register tens carried over from lower wheels. This is done by the springs P and timed by an escapement mechanism which will next be described.

Figure 7:
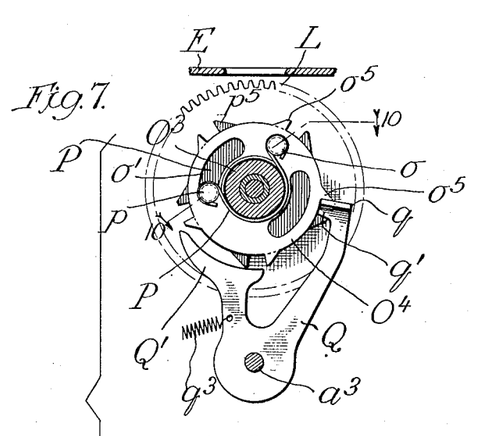
Fig. 7 is a section on the line 7—7 of Fig. 4.
Figure 8:
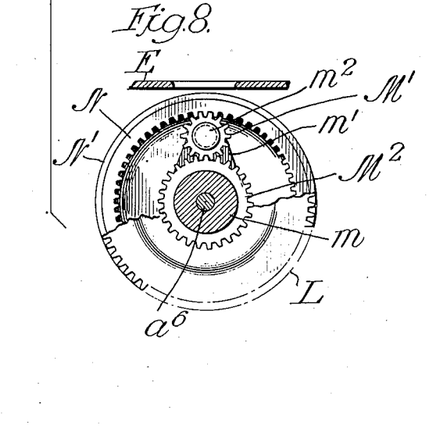
Fig. 8 is a section substantially on the line 8—8 of Fig. 4.
Figure 9:
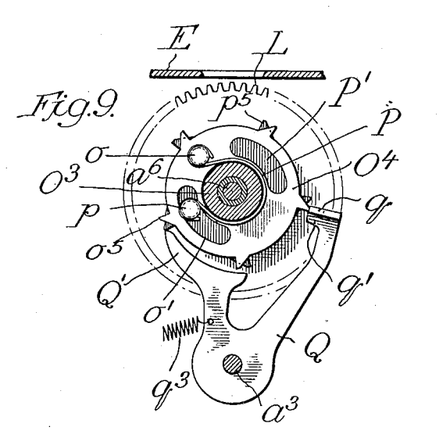
Fig. 9 is a view similar to Fig. 7 but illustrating a different condition.
Figure 10:
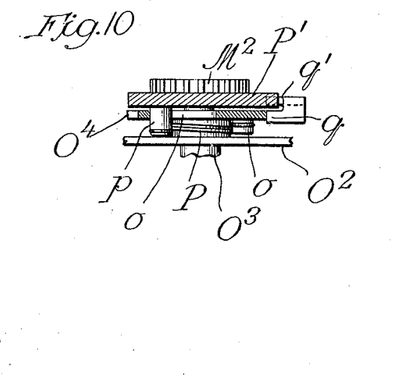
Fig. 10 is a section taken substantially on the line 10—10 of Fig. 7.

The ratio between the pinion $N^3$ on a number wheel and the internal gear $O^2$ which it drives is such that for every complete rotation of the number wheel the disk $O^4$ makes one-fifth of a rotation; therefore said disk has upon its periphery five equi-distant cam projections $o^5$ beveled on one side and radial on the other, and the disk P' similarly has five equi-distant projections $p^5$ with radial sides facing oppositely to the projections $o^5$ of the disk $O^4$, as clearly shown in Figs. 7 and 9. There is an escapement lever or pallet Q for each pair of the disks $O^4$ and P' and journaled upon the cross-rod $a^3$. At the extremity of one arm of this pallet there is a laterally turned portion $q$ which rises upon the periphery of the disk $O^4$. Closely adjacent this portion there projects from the body of the pallet a finger $q'$ in the plane of the disk P', see Fig. 10, the inner edge of which (i. e. the edge toward the pivot of the pallet) is designed to be abutted by the radial side of one or another of the projections $p^5$, as illustrated in Fig. 7. This may be regarded as the normal condition and here it will be noted that the radial side of one of the projections $o^5$ is engaged with the outer side of the laterally turned end portion $q$ of the pallet, the associated number wheel, i. e. the number wheel which is directly connected to the disk $O^4$ being at zero. The other arm of the pallet has a crescent shaped end-portion Q' overlying approximately one-fifth of the circumference of the disk P' and serving (by contact of its inner curved edge against one of the projections $p^5$) to prevent disengagement of the finger $q'$ from the disk $P'$ except at the proper time, i. e. except as disengaged by the camming action of a projection $o^5$ against the end portion $q$ of the pallet, as illustrated in Fig. 9. At such time the point or forward extremity of the crescent $Q'$ moves into momentary engagement with the projection $p'$ next but one to that from which the finger $q'$ has been disengaged. This is to prevent possibility of the intermediate projection $p^5$ passing the finger $q'$. Springs $q^3$ applied to the pallets Q rock them in a direction to engage their fingers $q'$ with the disks $P'$, and it will be understood that when a number wheel moves from "9" to zero the corresponding projection $o^5$ passes entirely by the pallet end portion $q$. Immediately it has passed the spring applied to the pallet throws the finger $q'$ against the periphery of the disk $P'$ and in the path of the oncoming projection $p^5$. In this connection it may be observed that the edge of the crescent $Q'$ at the forward extremity on the inner side is rounded so that the projection $p^5$ which has encountered the end of the crescent may get a camming action thereon to aid in forcibly throwing the finger $q'$ into the path of the projection $p^5$ next ahead.

With the disk $P'$ locked by the arm Q of the pallet, as illustrated in Fig. 7, it will be seen that the turning of the lower order wheel of two adjacent wheels will, through the gears $N^3$, O, $O'$ and $O^2$, wind up or tension the spring P by turning the disk $O^4$, the slot $o'$ providing for this turning of said disk independently of the other disk $P'$. Therefore the spring is always ready to instantly advance the disk $P'$ upon release of the latter from the escapement lever or pallet. It will be understood, of course, that the ratio between sun gear $N^3$ and the number wheel gear N is such that the one-fifth turning of the sun gear with the disk $P'$ will advance the number wheel, through the medium of the planet gear $M'$, one-tenth of a revolution or one numerical step. Obviously such transfer or carrying action can take place simultaneously with the turning of the number wheel by its key-actuated sector.

The above described combination of planetary gearing and escapement devices provides a construction of carrying mechanism which is thoroughly reliable and extremely speedy in operation, besides having advantages in the matter of compactness in assemblage. In the latter connection it may be noted that the gears L have off-set or depressed central portions coming in line with the gears N and that the gears $M^2$ come in line with the outer portions of the gears L, see Fig. 4.

Passing now to the matter of re-setting the number wheels to zero, this is done by turning all of the wheels forward to the "9" position and in the same operation pulling the units sector down one step so that when released it will turn the units wheel to zero and the other wheels will be turned to zero through the carrying action that ensues. To advance the wheels to the "9" position the internal gears $O^2$ are laid hold of, it being obvious that by turning them the number wheels will be rotated. Each of said internal gears carries projecting laterally from its web five equi-distant studs or pins $o^6$ and one or another of these is adapted to be acted upon by a hook R which normally stands forward out of the path of said studs, as shown in Figs. 1 and 13. It is so held by a cross rod $a^7$ against the stress of a spring $R'$ connecting a lower portion of the hook with cross rod $a^8$.

Figures 14, 15:
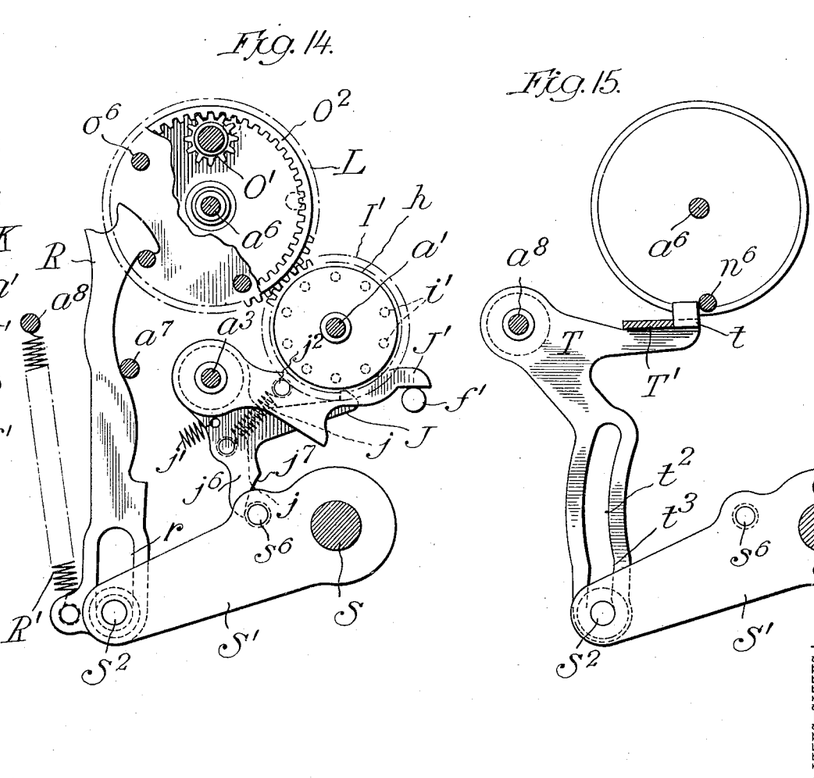
Fig. 14 is a similar view showing a changed condition.
Fig. 15 is a section on a different vertical plane under the same condition as Fig. 14.
Figure 16:
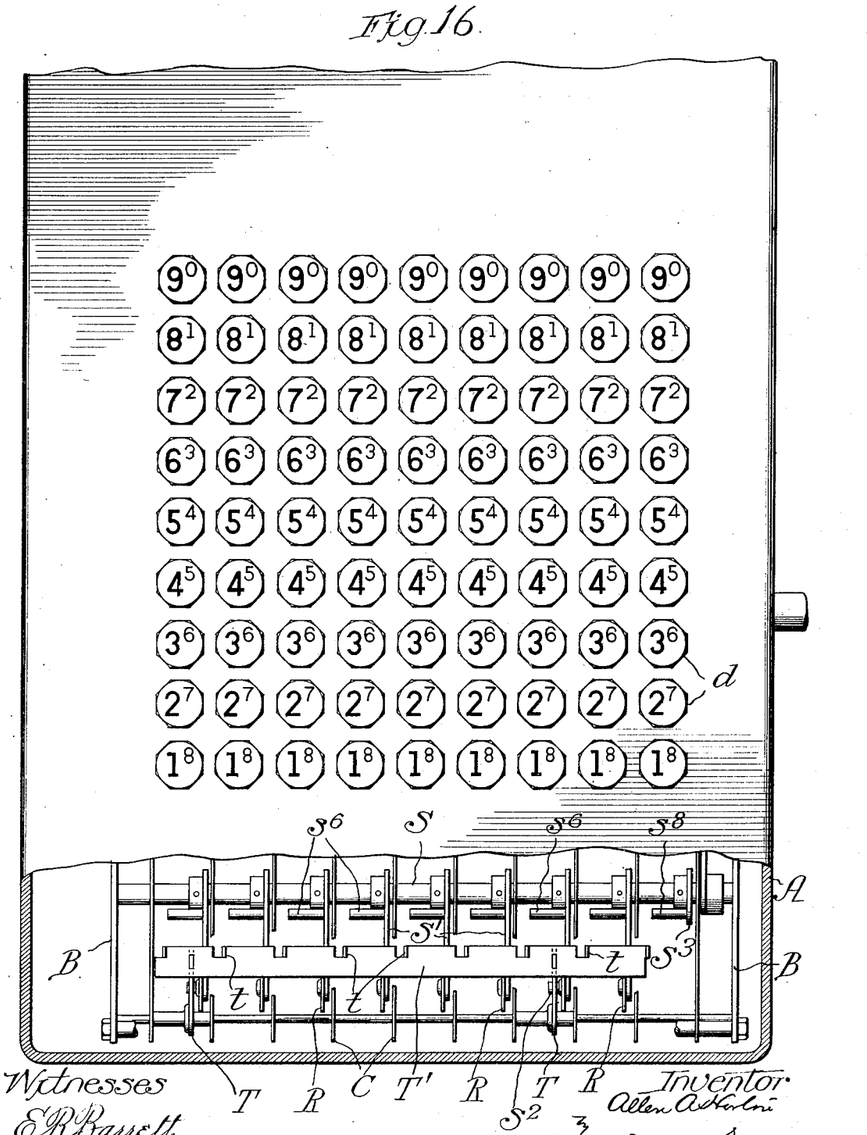
Fig. 16 is a top plan view of the machine with the adding wheels and gearing removed to disclose parts of the zero-setting mechanism.

A rock shaft S journaled in suitable bearings at the front part of the machine carries a series of arms $S'$ extending alongside the lower portions of the hooks R respectively, and equipped with studs $S^2$ engaging longitudinal slots $r$ in the hooks. Normally the springs $R'$ tend to rock the hooks upon said studs, which are then in the upper ends of said slots, but such motion of the hooks is resisted by the cross rod $a^7$ which is then engaging seats or sockets in the rear edges of the hooks as illustrated in Fig. 13. When the arms $S'$ are swung downward by the rocking of the shaft S in the direction of the arrow the first effect is to turn the hooks R to a limited extent, the cross rod $a^7$ supplying fulcra. Thereby the hooks are brought into position at their upper ends to engage pins or studs $o^6$. Continued downward swinging of the arms $S'$ brings their studs $S^2$ to the lower ends of the slots $r$, whereupon the hooks are drawn downward, stretching the springs $R'$ (Fig. 14), and will pick up the gears $O^2$, by engagement with their studs or pins $o^6$, at varying points according to what the number wheels are registering at the time. The relation between these parts is such that the full downward movement of the hooks, produced by downward swinging of the arm $S'$, will rotate the number wheels forward to the 9 position. The formation of the rear edges of the hook members above the seats or sockets which normally engage the cross rod $a^7$ is such as to accommodate the arc movement of the portions of the hooks engaged with the studs or pins $o^6$, the said edges having a reverse curvature in the arc of a circle, as clearly shown in Figs. 13 and 14. In order to prevent overthrow of the wheels in the zero setting operation, i. e., movement beyond the "9" position, a pair of levers T of bell crank form are loosely mounted upon the cross rod $a^8$ (Figs. 13, 15 and 16). The rearwardly extending arms of these levers carry a cross-bar or plate $T'$ having upstanding lugs $t$ one for each number wheel and adapted to be moved into the paths of pins or studs $n^6$ projecting from the webs $N^2$ of the latter and so located thereon that when said wheels exhibit 9s the studs have arrived at the rear sides of these lugs, as shown in Fig. 15. In the present construction the lugs are not brought into such position until the hooks R have descended some distance, though said lugs are brought to effective position in ample time to prevent the possibility of overthrow. Suitable provision is made for so timing the action of these stop lugs, as follows: The depending arms of the bell-crank levers T are formed with longitudinal slots, the upper portions $t^2$ of which are normally concentric with the shaft S but lower portions $t^3$ of which are eccentric thereto or of cam formation. The studs $S^2$ of adjacent arms $S'$ extend through these slots and traverse the concentric portions $t^2$ thereof during the greater portion of the downward swing of the arms $S'$, but as these arms complete their downward movement, the studs act upon the eccentric or cam portions $t^3$ of the slots and thereby rock the levers and project the lugs $t$ into the paths of the number wheel studs $n^6$.

It is of course necessary that the wheels be unlocked before the hooks R start downward. To this end the locking pawls J have downward extensions $j^6$ with curved rear edges $j^7$ normally eccentric to the shaft S, and the arms $S'$ have studs or pins $s^6$ adapted, during the first part of the downward movement of said arms, to act upon the corners at the upper ends of said edges and disengage the pawls from the lantern wheels $I^3$ as illustrated in Fig. 14, then holding said pawls displaced, during the further downward movement of the arms, by reason of the studs traversing the curved edges then concentric with the shaft S, Fig. 14. As to all but the units pawl this does not have any effect upon the sectors $F'$, as the springs $j$ stretch, being inferior to the sector springs $F^2$. However, it will be remembered that the units locking pawl $J^2$ is integral with the rearwardly extending arm which engages the sector stud $f$. Hence when the pawl is rocked to disengage it from the lantern wheel the sector will be forced downward. The relation of parts is such that the downward movement of the sector thus produced is exactly equal to the movement produced by depression of the "1" key. Hence when the shaft S is released and restores to normal the units sector will turn its wheel one step forward or from "9" to zero, and a carrying action will ensue all the way across the series of wheels so that all come to zero position.

Figure 4:
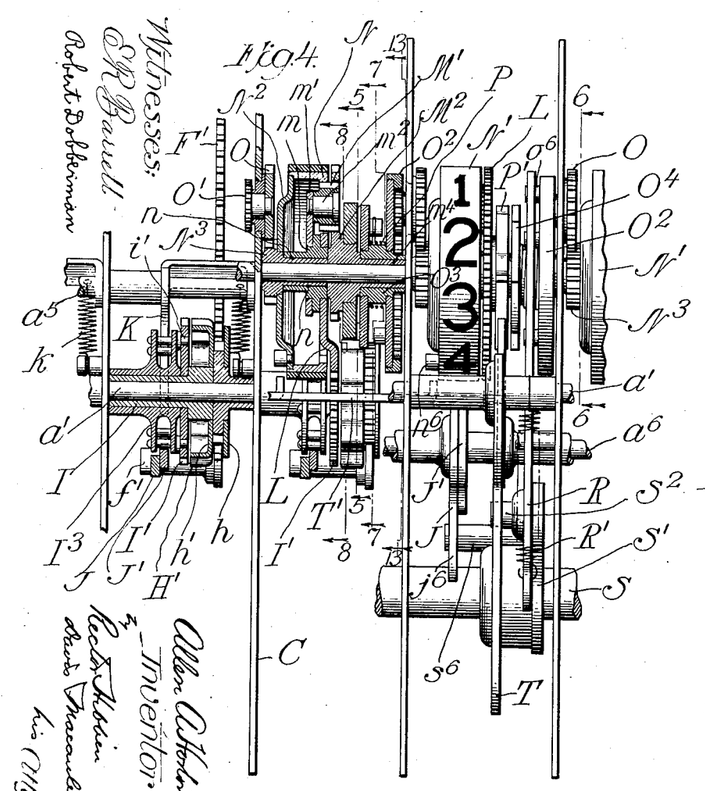
Fig. 4 is a front elevation and axial section of registering mechanism.
Figure 5:
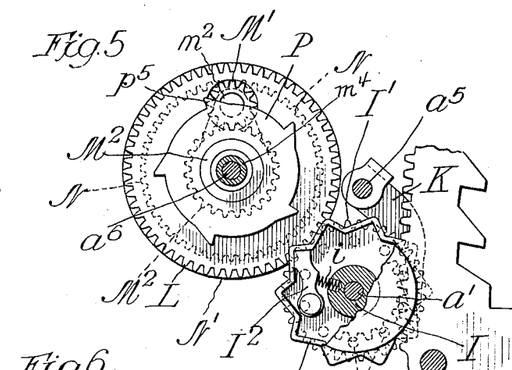
Fig. 5 is a section on the line 5—5 of Fig. 4.
Figure 6:
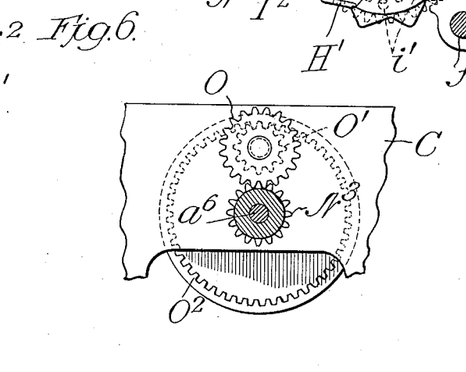
Fig. 6 is a vertical cross-section taken on the line 6—6 of Fig. 4.

As the arm $S'$ which acts to turn the units wheel carries the stud $s^6$ which unlocks the tens train of gear (owing to the lateral relationship of parts as shown in Fig. 4, the units gear $O^2$ being spaced considerably leftward of the units lantern wheel $I^3$ and the studs $s^6$ projecting leftward, as the machine is viewed from the front), a short additional arm $S^3$ is secured on the rock shaft S near its right hand end to operate the pawl $J^2$, the latter having a depending branch $j^7$ like those of the pawls J, and the said short arm having a stud $s^8$ to act thereon, Figs. 11 and 12.

Actuation of the rock shaft S is effected by a hand lever W arranged at the right hand side of the machine, as shown in Figs. 1, 11 and 12, and screwed to rotative engagement with a short rock shaft $W'$ which carries a crank arm $W^2$ operatively connected to a similar crank arm $S^4$ secured to the rock shaft S. The connection is preferably a yielding one in the interest of safeguarding the machine against violent usage and of protection in the event of a hitch in the operation. Thus a link member $W^4$, pivoted to the crank arm $W^2$, is longitudinally slotted at its other end to embrace a stud $S^7$ on the crank arm $S^4$, and springs X connect a cross head $W^5$, at the slotted end of the link $W^4$, with a cross head $S^5$ at the similarly slotted end of a link member $S^6$, which at its forward end is pivoted on the stud $S^7$ and at its rear end embraces the pivot stud $w$ on the crank arm $W^2$. A spring Y attached to the cross head $S^5$ and to the frame work restores the rock shaft S after it has been rocked one way by the handle W.

Naturally the first thing that must occur on the turning of the register to zero is the unlocking of the gears, and it will be noted that the studs $s^6$ and $s^8$ stand ready to immediately rock the pawls J and $J^2$ and further that a very short movement is required to fully disengage the pawls from the lantern wheels so that this will occur before there is any downward movement of the hooks R, though in case of a number wheel standing at zero to begin with the associated hook R would swing into engagement with one of the studs $o^6$ (see Fig. 13) during this first short portion of the movement of the handle W. Downward movement of the units sector one step would also necessarily take place during this same period. As to the timing of the stop-bail T T', an early movement to put its lugs $t$ into the paths of the studs $n^6$ would not be obstructed, nor would it interfere with anything, but if the bail got its movement upward at the beginning of the operation, it would not restore until the end of the operation, whereas at such time the gears must have been seasonably unlocked for the one-step movement from "9" to zero. Hence it is preferable to throw the bail to locking position during the latter part of the forward stroke of the handle and correspondingly retract it during the first part of the return stroke of said handle, as provided for by the hereinbefore described construction.

It will be understood that in the carrying operation, whether occurring in registering operations or zero setting operations, the pawls J hold the gears I from turning forward,—these pawls, in the case of zero-setting, being brought back into the paths of lantern wheel pins before the carry actually occurs.

Any suitable means may be employed for limiting the movement of the handle. In the present instance, the stud, w, is extended outward to abut the ends of arms B² which spring from the lower bar of the right side frame piece B.

What is claimed is:

1. In a machine of the character described, the combination with a lever and depressible keys for differentially operating the same; of a stop member for the lever; and means for moving said stop member in opposite directions by adjacent keys to position it for engagement with the lever to stop the latter at different degrees of movement.

2. In a machine of the character described, the combination with a lever and depressible keys for differentially operating the same; of a stop member for the lever and a bar connected to said stop member and movable oppositely by adjacent keys to position the stop member for engagement with the lever to stop the latter at different degrees of movement.

3. In a machine of the character described, the combination with a lever and depressible keys for differentially operating the same; of a stop member for the lever; a bar connected to said stop member and movable oppositely by adjacent keys to position the stop member for engagement with the lever to stop the latter at different degrees of movement; and means for normally holding said bar in a neutral position.

4. In a machine of the character described, the combination with adding mechanism and operating keys therefor; of stop members one having confronting series of shoulders and the other adapted for engagement with said shoulders and one such member being movable oppositely by different keys and the other member being differentially driven by the keys in operating the adding mechanism.

5. In a machine of the character described the combination of an actuating lever having confronting series of stop shoulders; keys for differentially actuating said lever; and a stop member movable oppositely by different keys to engage a shoulder of one series or the other.

6. In a machine of the character described, the combination of an actuating lever having confronting series of stop shoulders; keys for differentially actuating said lever; a swinging stop member adapted to engage a shoulder of one series when moved one way and a shoulder of the other series when moved the other way; and means for oppositely moving said member by different keys.

7. In a machine of the character described, the combination of an actuating lever having confronting series of stop shoulders; keys for differentially actuating said lever; a swinging stop member adapted to engage a shoulder of one series when moved one way and a shoulder of the other series when moved the other way; and a reciprocating bar attached to said member and operated upon by the keys with provisions for moving said bar oppositely by different keys.

8. In a machine of the character described, the combination of an actuating lever having confronting series of stop shoulders; keys for differentially actuating said lever; a swinging stop member adapted to engage a shoulder of one series when moved one way and a shoulder of the other series when moved the other way; and a reciprocating bar attached to said member and operated upon by the keys, said bar having alternating oppositely inclined cam projections one for each key.

9. In a machine of the character described, the combination of an adding wheel; an actuator lever therefor having two confronting series of shoulders, those of one series staggered with relation to those of the other; a swinging stop adapted to engage said shoulders; a bar connected to said stop and having two series of cams those of one series alternating with those of the other and oppositely inclined relative thereto; and a series of depressible keys to act upon the lever different distances from its pivot and having studs to act upon the cams of said bar, the odd keys acting upon one series of said cams to swing the stop one way and the even keys acting upon the other series of cams to swing the stop the other way.

10. In a machine of the character described, the combination of an adding wheel; an actuator lever therefor having two confronting series of shoulders, those of one series staggered with relation to those of the other; a swinging stop adapted to engage said shoulders; a bar connected to said stop and having two series of cams, those of one series alternating with those of the other and oppositely inclined relative thereto; a series of depressible keys to act upon the lever different distances from its pivot and having studs to act upon the cams of said bar, the odd keys acting upon one series of said cams to swing the stop one way and the even keys acting upon the other series of cams to swing the stop the other way; and a spring applied to the stop to centralize it.

11. In a machine of the character described, the combination of adding wheels; actuators therefor, planetary gearing between actuators and wheels; an escapement wheel applied to the sun wheel of the higher order train; a spring connected to said escapement wheel and to the lower order wheel to be tensioned thereby; and an escapement detent tripped by said lower order wheel.

12. In a machine of the character described, the combination of adding wheels; actuators therefor; planetary gearing between actuators and wheels; an escapement wheel applied to the sun wheel of the higher order train; a coiled spring connected to said escapement wheel and to the lower order wheel to be tensioned thereby; and an escapement detent tripped by said lower order wheel.

13. In a machine of the character described, the combination of adding wheels; actuators therefor; planetary gearing between actuators and wheels; an escapement wheel applied to the sun wheel of the higher order train; a cam disk turning with the lower order wheel; a spring connecting the said disk to the escapement wheel; and an escapement detent engaging the latter and the cam disk.

14. In a machine of the character described, the combination of adding wheels; actuators therefor; planetary gearing between actuators and wheels; an escapement wheel applied to the sun wheel of the higher order train; a cam disk turning with the lower order wheel; a spring connecting the said disk to the escapement wheel; and an escapement pallet one arm of which has portions engaging respectively the escapement wheel and the said cam disk and the other arm of which has a widened end portion spanning the space between two projections of the escapement wheel.

15. In a machine of the character described, the combination of adding wheels; actuators therefor; planetary gearing between actuators and wheels; an escapement wheel applied to the sun wheel of the higher order train; a cam disk turning with the lower order wheel; a spring connecting the said disk to the escapement wheel; and an escapement pallet one arm of which has portions engaging respectively the escapement wheel and the said cam disk and the other arm of which has a cam end for a projection of the escapement wheel to act upon.

16. In a machine of the character described, the combination of adding wheels; actuators therefor; planetary gearing between actuators and wheels; an escapement wheel applied to the sun wheel of the higher order train; a cam disk turning with the lower order wheel; a spring connecting the said disk to the escapement wheel; and an escapement pallet one arm of which has portions engaging respectively the escapement wheel and the said cam disk and the other arm of which has a widened end portion spanning the space between two projections of the escapement wheel, and a cam terminal of said widened portion for a projection of the escapement wheel to act upon.

17. In a machine of the character described, the combination of adding wheels; actuators therefor; planetary gearing between actuators and wheels; an escapement wheel applied to the sun wheel of the higher order train; a coiled spring concentric with said wheels and connected to said escapement wheel and to the lower order wheel to be wound thereby; and an escapement detent tripped by said lower order wheel.

18. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun gear normally fixed; an escapement wheel carried by the sun-gear of the higher order train; a coiled spring concentric with the sun gear and attached at one end to said escapement wheel; a cam disk to which the other end of said spring is attached; gearing connecting said cam disk to the lower order adding wheel; and an escapement pallet engaging the cam disk and the escapement wheel.

19. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun gear normally fixed; an escapement wheel carried by the sun-gear of the higher order train; a coiled spring concentric with the sun-gear and attached at one end to said escapement wheel; a cam disk to which the other end of said spring is attached; an escapement pallet engaging the cam disk and the escapement wheel; an internal gear unified with said cam disk; a gear on the lower order wheel; and intermediate pinions connecting said gear and the internal gear.

20. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun-gear normally fixed;

an escapement wheel carried by the sun-gear of the higher order train; a coiled spring concentric with the sun gear and attached at one end to said escapement wheel; a cam disk to which the other end of said spring it attached; an escapement pallet engaging the cam disk and the escapement wheel; an internal gear unified with said cam disk; a gear on the lower order wheel; intermediate pinions connecting said gear and the internal gear; a pawl adapted to engage the latter for turning the wheel to a position one step short of zero; actuating means for said pawl; and a device operated by said means to impart a one-step movement to the actuator of the units order.

21. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun-gear normally fixed; an escapement wheel carried by the sun-gear of the higher order train; a coiled spring concentric with the sun gear and attached at one end to said escapement wheel; a cam disk to which the other end of said spring is attached; an escapement pallet engaging the cam disk and the escapement wheel; an internal gear unified with said cam disk; a gear on the lower order wheel; intermediate pinions connecting said gear and the internal gear; a pawl adapted to engage the latter for turning the wheel to a position one step short of zero; actuating means for said pawl; a device operated by said means to impart a one-step movement to the actuator of the units order; and a stop to prevent movement of the wheel past the said position, said stop set by said means.

22. In a machine of the character described, the combination of adding wheels, differential actuators therefor, pawls for turning the wheels to corresponding positions one step short of zero, carrying mechanism between the wheels, means for operating said pawls, and a device actuated by said means to impart a one-step movement to the actuator of the units order.

23. In a machine of the character described, the combination of adding wheels, differential actuators therefor, pawls for turning the wheels to corresponding positions one step short of zero, carrying mechanism between the wheels, means for operating said pawls, stops set by said means to prevent advance of the wheels beyond such positions, and a device actuated by said means to impart a one-step movement to the actuator of the units order.

24. In a machine of the character described, the combination of adding wheels; actuators therefor; gearing between the actuators and wheels; locking pawls normally engaging said gearing to prevent forward movement thereof; pawls for turning the wheels to positions one step short of zero; means for operating the latter pawls and disabling the locking pawls and imparting a one-step movement to the units actuator; and carrying mechanism between the wheels.

25. In a machine of the character described, the combination of adding wheels; actuators therefor; gearing between the actuators and wheels; locking pawls normally engaging said gearing, one such pawl having a portion engaging the units actuator; arms spring connected to the other pawls and engaging the other actuators; pawls for turning the wheels to positions one step short of zero; means for operating the latter pawls and the first mentioned pawls; and carrying mechanism between the wheels.

26. In a machine of the character described, the combination of adding wheels; actuators therefor; gearing between the actuators and wheels; locking pawls normally engaging said gearing; one such pawl having a portion engaging the units actuator; arms spring connected to the other pawls and engaging the other actuators; pawls for turning the wheels to positions one step short of zero; a rocking structure comprising arms engaging the latter pawls and studs to operate upon the first-mentioned pawls; a handle applied to said rocking structure; and carrying mechanism between the wheels.

27. In a machine of the character described, the combination of adding wheels having correspondingly positioned stop studs; actuators for the said wheels; pawls for turning them to positions one step short of zero; a bail having lugs to enter the paths of the wheel-studs; means for operating the pawls and said bail and imparting a one-step movement to the units actuator; and carrying mechanism between the wheels.

28. In a machine of the character described, the combination of adding wheels having correspondingly positioned stop-studs; actuators for the said wheels; pawls for turning them to positions one step short of zero; a bail having lugs to enter the paths of the wheel-studs; a rocking structure having arms engaged with said pawls and with said bail and adapted to impart a one-step movement to the units actuator; a handle applied to said rocking structure; and carrying mechanism between the wheels.

29. In a machine of the character described, the combination of adding wheels having correspondingly positioned stop-studs; actuators for the said wheels; pawls for turning them to positions one step short of zero; a bail having lugs to enter the paths of the wheel-studs and cam slotted arms; a rocking structure having arms engaged with said pawls and studs engaging the cam-slots of the bail-arms; means operated by said rocking structure for imparting a one-step movement to the units actuator; a handle applied to said rocking structure; and carrying mechanism between the wheels.

30. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun-gear normally fixed; an escapement wheel carried by the sun-gear of the higher order train; a cam disk; a spring connecting the latter and the escapement wheel; an escapement detent engaging the latter and the cam disk; gearing connecting said disk and the lower order wheel; and means applied to said gearing for turning the latter to a position one step short of zero and operating to impart a one-step movement to the actuator of the units order.

31. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun-gear normally fixed; an escapement wheel carried by the sun-gear of the higher order train; a cam disk; a spring connecting the latter and the escapement wheel; an escapement detent engaging the latter and the cam disk; an internal gear unified with said cam disk; a gear on the lower order wheel; intermediate pinions connecting said gear and the internal gear; a pawl adapted to engage the latter for turning the wheel to a position one step short of zero; actuating means for said pawl; and a device operated by said means to impart a one-step movement to the actuator of the units order.

32. In a machine of the character described, the combination of adding wheels; actuators therefor; planetary gearing between actuators and wheels comprising internal gears on the wheels, a planet gear in mesh therewith, an actuator gear carrying the planet gear and concentric with the internal gear, and a sun-gear normally fixed; an escapement wheel carried by the sun-gear of the higher order train; a cam disk; a spring connecting the latter and the escapement wheel; an escapement detent engaging the latter and the cam disk; an internal gear unified with said cam disk; a gear on the lower order wheel; intermediate pinions connecting said gear and the internal gear; a pawl adapted to engage the latter for turning the wheel to a position one step short of zero; actuating means for said pawl; a device operated by said means to impart a one-step movement to the actuator of the units order; and a stop to prevent movement of the wheel past the said position, said stop set by said means.

ALLEN A. HORTON.

Witnesses:
F. C. RINSCHE,
ARTHUR W. FRENZEL.